United States Patent [19]

Aparicio, Jr.

[11] Patent Number: 5,558,343

[45] Date of Patent: Sep. 24, 1996

[54] WATER PUMP SEAL ASSEMBLY

[75] Inventor: J. Oscar Aparicio, Jr., Aurora, Ill.

[73] Assignee: General Motors Corporation, Detroit, Mich.

[21] Appl. No.: 578,291

[22] Filed: Dec. 26, 1995

[51] Int. Cl.$^6$ ..................................................... F16J 15/36
[52] U.S. Cl. ......................... 277/88; 277/93 R; 415/170.1
[58] Field of Search .......................... 277/82, 88, 93 R, 277/93 SD; 415/170.1, 173.2, 173.3

[56] References Cited

U.S. PATENT DOCUMENTS

| | | | |
|---|---|---|---|
| 1,717,847 | 9/1929 | Litle | 415/170.1 X |
| 4,415,167 | 11/1983 | Gits | 277/88 |
| 5,123,660 | 6/1992 | Dahlheimer et al. | 277/88 |
| 5,199,719 | 4/1993 | Heinrich et al. | 277/88 X |

OTHER PUBLICATIONS

Electro–Motive Division, General Motors corporation, "710G3B/G3B–EC Turbocharged Engine Maintenance Manual" First Edition, Nov. 1994 Doc #EE000003, pp. 10–19 thru 10–17.

Electro–Motive Division, General Motors Corporation, "710G3 Turbocharged Engine Maintenance Manual" 2nd Edition, pp. 10–15 thru 10–19/10–10.

*Primary Examiner*—Richard E. Gluck
*Attorney, Agent, or Firm*—Karl F. Barr, Jr.

[57] ABSTRACT

A water pump is disclosed for use in an internal combustion engine. The water pump includes a seal assembly for use between the rotatable pump shaft and the water pump housing which is fixed relative to the shaft. The seal assembly includes a base carrier member which is fixed longitudinally and rotationally with respect to the pump shaft so as to rotate with the shaft. The base carrier member includes a seat for a first end of a compression spring member disposed coaxially about said cylindrical body. The seal assembly also includes a sliding carrier member which extends coaxially relative to the pump shaft in longitudinally slidable, rotationally fixed, coaxial disposition with the base carrier member so as to rotate with the base carrier member and the pump shaft and move longitudinally relative to said base carrier member. A spring member operates to move the sliding carrier member longitudinally along the water pump shaft relative to the fixed base carrier. A hydrodynamic sealing disc is disposed between the sliding carrier member and the fixed housing and is fixed relative to the carrier member so as to rotate against the fixed housing to define a hydrodynamic seal therebetween. The sliding carrier operates to locate the sealing disc longitudinally against the fixed housing under the bias of the compression spring. An elastomeric sealing member is disposed between the sealing disc and the pump shaft to define a seal therebetween.

3 Claims, 3 Drawing Sheets

WATER PUMP SEAL ASSEMBLY

TECHNICAL FIELD

The invention relates to a water pump for an internal combustion engine and, in particular, to an assembly for sealing the pump shaft at the housing interface.

BACKGROUND

Water pumps for circulating coolant within an internal combustion engine typically employ a shaft mounted and driven impeller to pressurize and move the coolant. The impeller shaft may be gear driven internally of the engine block or driven through an accessory drive system operating outside of the crankcase. In either case it is necessary to provide an adequate seal between the wet, impeller side of the pump and the dry, shaft bearing side. Significant failure of the seal may lead to shaft bearing failure while minor failure erodes operator confidence in the reliability of the seal. Current water pump seal design makes use of a carbon wear disc which is torsionally driven against a stationary bushing portion of the pump housing. As the disc is rotated it establishes a hydrodynamic seal at its interface with the pump housing thereby providing an effective seal. Over the life of the water pump seal, the wear disc is subject to a reduction in thickness due to continued rotation and wear against the pump housing. Effective sealing force is typically maintained between the carbon wear disc and the housing through a spring member which is operable to impart a force on the disc in the direction of the stationary pump housing as well as to torsionally drive the wear disk through a coupling with the impeller. Because the spring has to torsionally drive the wear disc, it has a tendency towards torque wrap-up requiring that it have a higher spring rate than required to maintain the wear disc in contact with the bushing surface. The increased spring rate accelerates the rate of wear on the disc and, consequently, the service life of the carbon wear disc may be reduced.

An elastomeric shaft seal may be used to seal the back side of the carbon wear disc against the waterpump shaft. As the carbon wear disc undergoes its inherent reduction in thickness with service time, the shaft seal slides progressively over the water pump shaft to remain in contact with the back of the wear disc and thereby maintain a coolant-tight seal. Because of the long wear process, the seal is prone to damage due to debris which could become lodged between the surface of the shaft and the seal. Such seal damage may lessen the useful life of the seal.

SUMMARY

The present invention relates to a water pump seal assembly for use in water pumps for internal combustion engines and the like. The subject seal assembly includes discrete driving elements which operate to transmit torque to a carbon wear disc used to seal the housing-shaft interface of the water pump independent of the spring force applied to the wear disc for axial sealing purposes. By transferring torque in this manner, a lighter-load spring member may be used to load the wear disc thereby extending the useful service life and reliability of the wear disk. The seal assembly is a robust design which includes semi-cylindrical, interlocking carriers which are configured to positively transmit torque from the pump impeller to a jointly rotating carbon wear disc which rotates relative to a fixed portion of the water pump housing, defining a sealing bushing to thereby establish a hydrodynamic seal between the wet and the dry sides of the water pump. A spring member is disposed between, and constrained by the interlocking carriers and is effective to exert a positive force on the carbon wear/sealing disc in the direction of the sealing bushing to assure an adequate seal as the wear disc is reduced axially over the service life of the pump due to friction-induced wear of the disc against the bushing. The interlocking carriers are, in addition, designed to enhance the circulation of coolant through the pump seal cavity thereby improving heat dissipation. Improved heat dissipation prolongs the useful service life of the water pump seal components; especially that of the elastomeric shaft seal.

An elastomeric shaft seal is incorporated into the seal assembly of the present invention and is effective to provide an improved sealing capability over known seals. The seal member is operable to define a seal at the back, non-wearing surface of the wear disc at its interface with the waterpump shaft. The seal design includes an expandable, bellows portion extending between two semi-autonomous, annular sealing members which operate to separately seal the shaft perimeter adjacent its interface with the carbon wear disc and the back, non-wearing surface of the wear disc adjacent the shaft interface. Together the two sealing members, when interconnected by the expandable bellows portion, provide an effective seal at the shaft-disc interface. As the carbon disc is subject to wear from its relative motion with the stationary housing, each semi-autonomous sealing member remains in its initial, sealed position while the bellowed portion of the seal unfurls with longitudinal movement of the disc. As a result, there is no requirement for progressive, axial sliding of the seal over the waterpump shaft as is the case with typical annular seal designs, thereby greatly reducing the durability concerns arising from seal sensitivity to debris and shaft surface imperfections such as pitting and rust.

These and other features, objects and advantages of the invention will be more apparent from the following detailed description and the drawings.

DESCRIPTION OF THE PREFERRED EMBODIMENT

Figure 1:
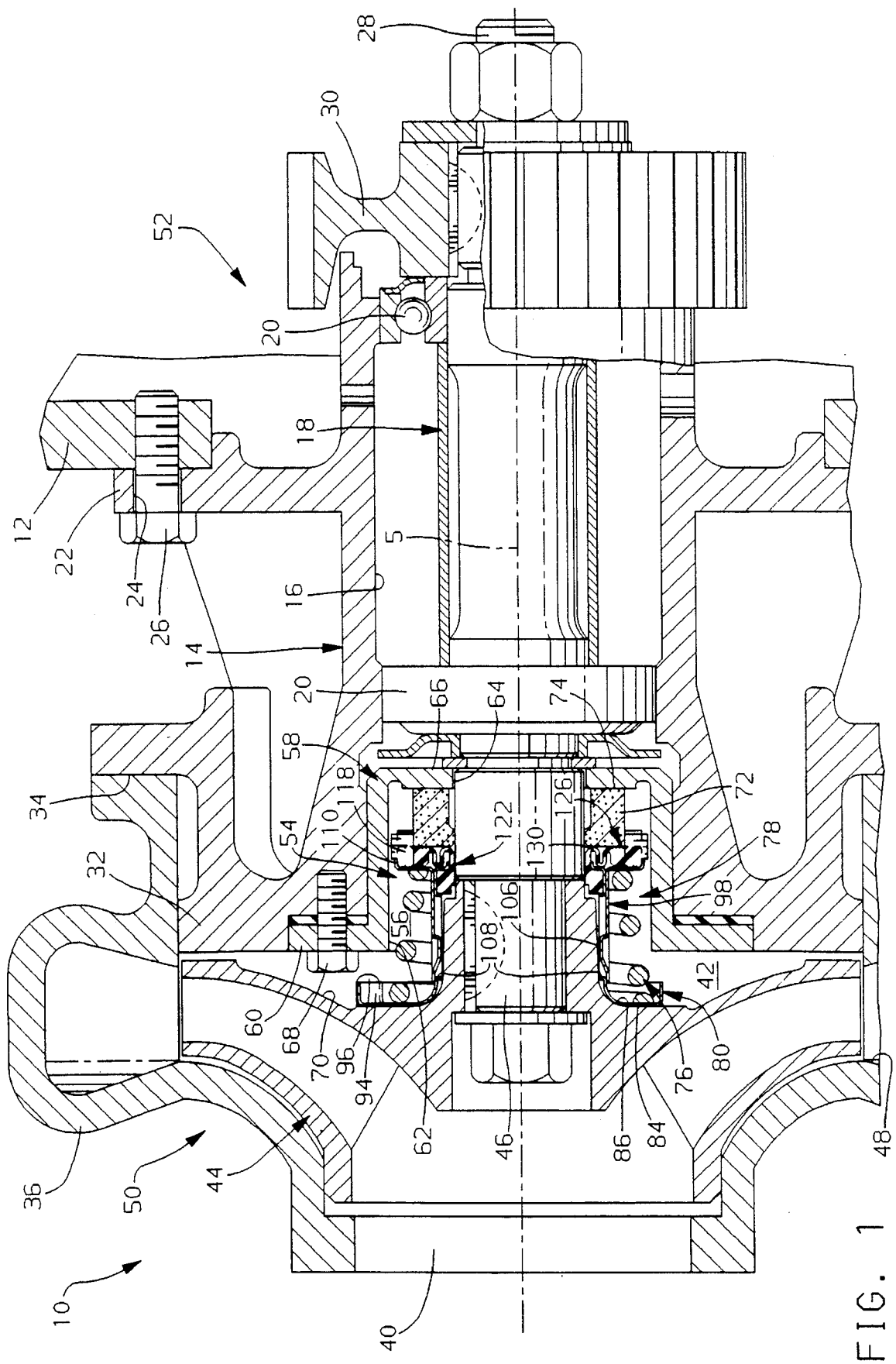
FIG. 1 is a partial, sectional view of a water pump, embodying features of the present invention, installed in an internal combustion engine.

FIG. 1 illustrates a water pump assembly, designated generally as 10, for circulating coolant through the cooling system of an internal combustion engine 12. The assembly is constructed around a support housing 14 having an axially extending opening 16 configured to receive a water pump shaft 18 supported by bearing assemblies 20. In the preferred embodiment shown in the Figures, the support housing 14 is configured for mounting its first end to the engine 12 and includes a mounting flange 22 with openings 24 for receiving fasteners such as bolts 26 which secure the housing in position. The water pump shaft 18 includes a first, inboard end 28 which, when mounted to engine 12 extends into the engine block and supports a drive gear 30. The drive gear 30 engages, and is driven by the engine crankshaft (not shown)

through associated drive gears (also not shown) in a manner which is well known.

At second end 32 of the support housing 14, a second flanged surface 34 receives an impeller housing 36 which is secured in position with fasteners such as bolts, not shown. The impeller housing 36 includes an inlet 40, an impeller cavity 42 and an outlet 48. The impeller cavity 42 houses a pump impeller 44 which is mounted, for rotation within the impeller cavity, to the second end 46 of the water pump shaft 18 which extends into the impeller cavity 42 from the support housing 14. During engine operation, crankshaft rotation is translated into rotation of the water pump shaft 18 which, in turn, rotates the impeller 44 in the impeller cavity 42 thereby drawing cooling fluid into the water pump through inlet 40 and expelling the fluid through the outlet 48.

In order to assure the durability of the water pump 10, the pump shaft 18 is supported by the bearing assemblies 20 which are isolated from the destructive environment present in the engine coolant. As such, the water pump is divided into a "wet", impeller side 50 and a "dry", support or bearing side 52 by a seal assembly 54, FIGS. 2, 3 and 4, disposed in a pump seal cavity 56 defined by a stationary bushing 58 located between the support housing 14 and the impeller housing 36. The stationary bushing 58 is a generally cup-shaped member having a flanged rim 60 about its opened end 62 and a shaft opening 64 through its closed end 66 and is configured to seat within an opening in the support housing in a manner which seals longitudinal shaft opening 16 from the impeller cavity 42 with the exception of the shaft opening 64. Fastening means such as bolts 68 are used to fix the flanged portion of the stationary bushing to the support housing 14. Upon assembly of the water pump 10, the pump shaft 18 protrudes from the dry, bearing side 52 of the support housing 14 to the wet, impeller side 50 through the opening 64 in the bottom 66 of the stationary bushing 58 for attachment with the pump impeller 44. As a result of the sealed relationship between the stationary bushing 58 and the support housing 14 only the clearance between the pump shaft 18 and opening 64 in the stationary bushing presents itself as a path for coolant leakage between the wet and dry sides 50,52 respectively, of the water pump 10.

Figure 2:
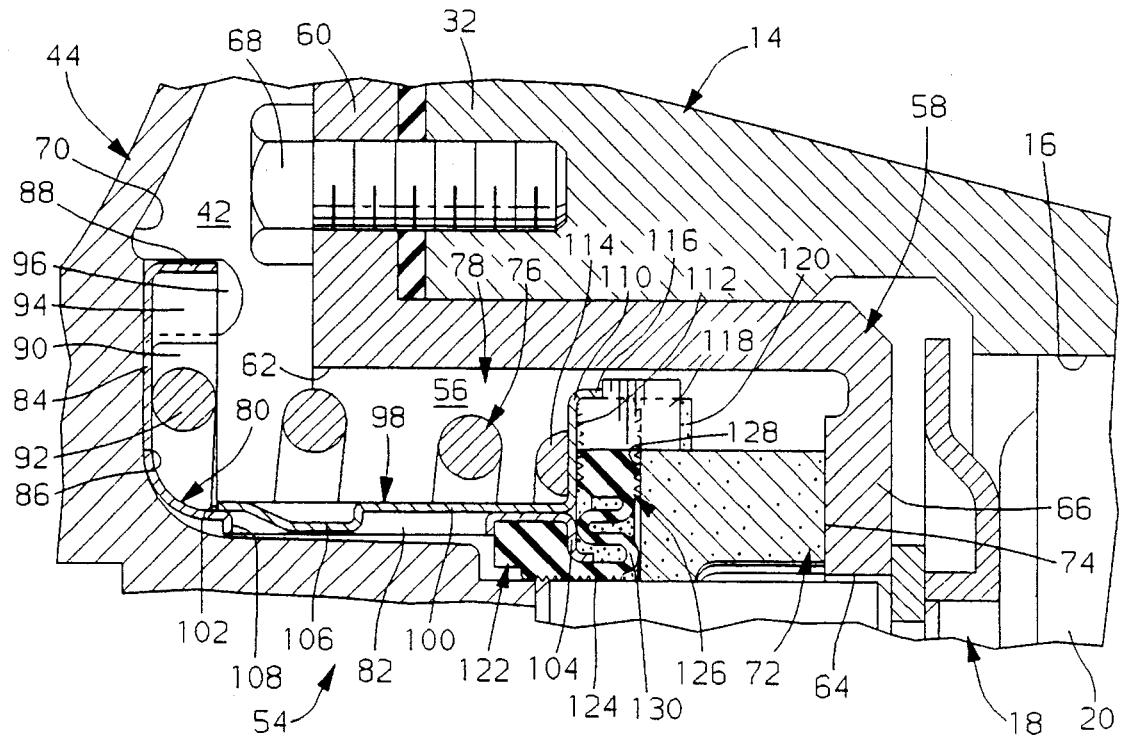
FIGS. 2 and 3 are partial enlarged views of a portion of FIG. 1 showing the pump seal assembly with differing degrees of wear.
Figure 3:
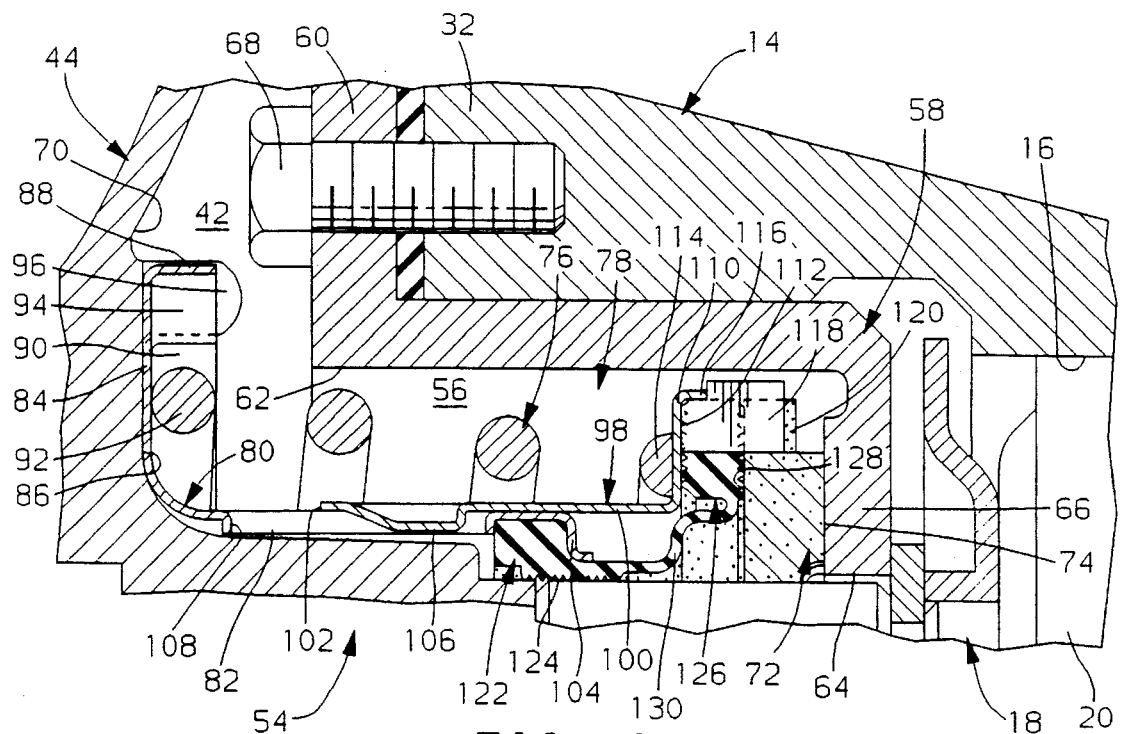
Figure 4:
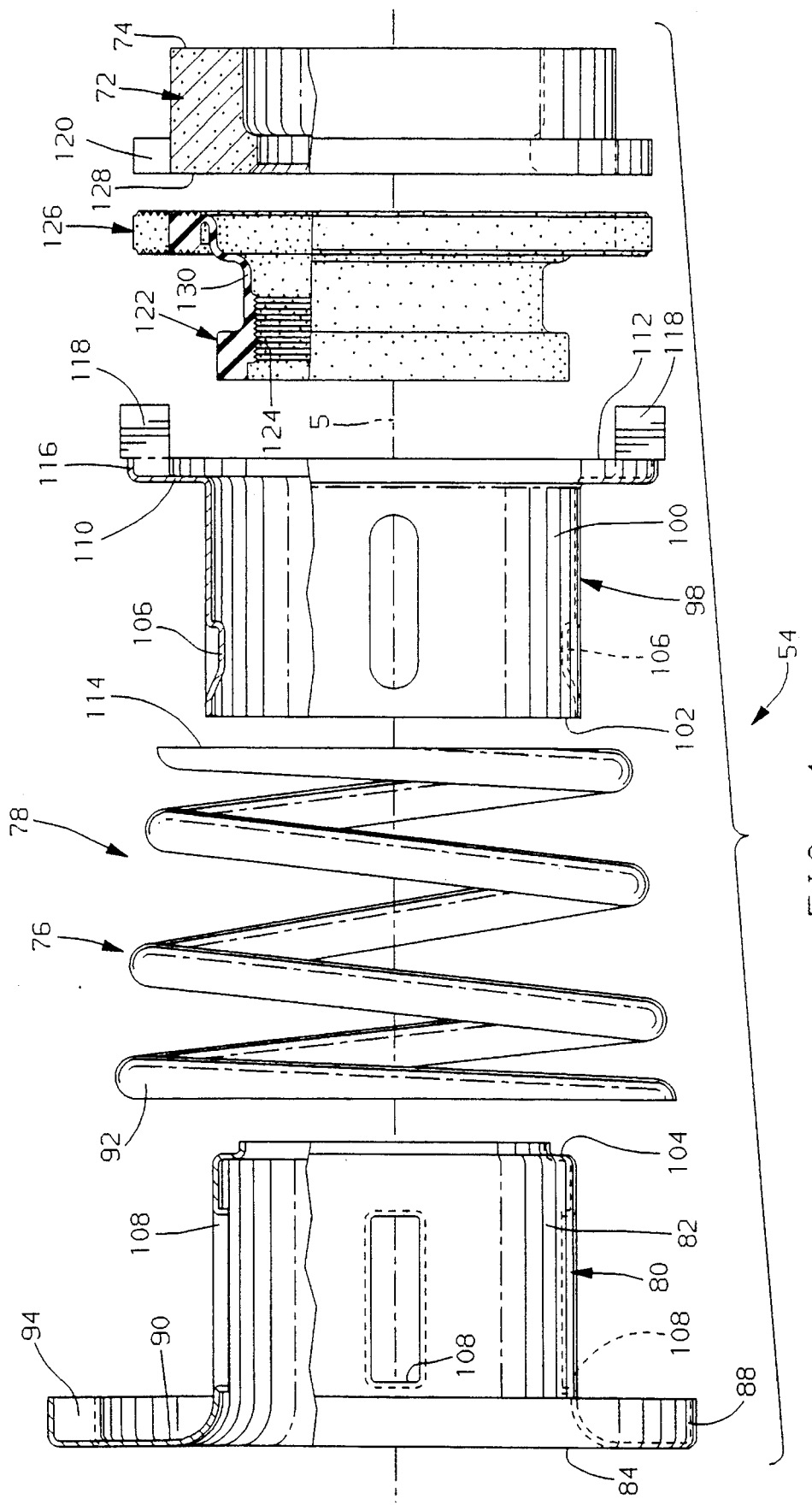
FIG. 4 is an expanded view of the seal assembly of the present invention.

The seal assembly 54, shown in detail in FIGS. 2, 3 and 4, is disposed in the pump seal cavity 56 defined by the cylindrical walls of the cup-shaped stationary bushing 58 and the back side 70 of the impeller 44, in coaxial relationship to the pump shaft 18 which extends through the pump seal cavity for attachment to the impeller. The seal assembly includes an annular, carbon fiber wear disc 72 which is disposed about the shaft 18 at the innermost end of the pump seal cavity 56 adjacent the closed end 66 of the stationary bushing 58. The carbon wear disc 72 has a first, sealing side 74 which, during operation of the water pump 10, is loaded axially against the bottom wall 66 of the stationary bushing and rotates with the pump shaft 18, relative to the stationary bushing to establish a hydrodynamic seal at the interface of the two components to thereby prevent the passage of coolant between the wet and dry sides 50, 52 of the water pump.

As noted above, in order to establish an effective seal between the pump shaft 18 and the stationary bushing 58, the carbon wear disc must be axially loaded against the bottom wall 66 and must rotate with the pump shaft 18 relative to the bottom wall. A compression spring 76 disposed about the pump shaft 18 and contained within an expanding carrier assembly 78 operates to axially position the wear disc 72 against the stationary bushing 58 while the expanding carrier assembly 78 transmits rotational torque to thereby rotate the wear disc relative to the stationary bushing. The compression spring 76 serves a two-fold purpose in the seal assembly. As noted, the spring loads the wear disc 72 against the bushing surface 66 to maintain an appropriate seal therebetween. In addition, however, the spring 76 assures that the wear disc 72 remains in contact with the bushing surface 66, and properly loaded in the axial direction, as the wear disc is longitudinally reduced in thickness due to wear caused by the relative rotation of the disc against the stationary bushing.

The expanding carrier 78 includes a first base member 80 having a cylindrical body 82 with an outwardly flanged portion 84 at a first end. The flanged portion 84 of base member 80 seats within a recess 86 in the back of the impeller 44 and includes a second flanged portion 88 which extends in parallel to the cylindrical body 82 and defines, with the body, an annular channel 90 which extends about the perimeter of the base member 80 to define a seat for a first end 92 of the compression spring 76. The annular channel 90 includes an inwardly extending tab 94 which engages a corresponding stop member 96 extending from the back 70 of the impeller 44. The tab 94 and the stop member 96 operate to rotationally lock the base member 80 with the pump impeller 44. The cylindrical body 82 of the base member 80 extends longitudinally about the pump shaft 18 from the impeller 44 in the direction of the stationary bushing 58, terminating at a location intermediate thereof. The expanding carrier assembly 78 further includes a second, sliding carrier 98 having a cylindrical body 100 with a first end 102 configured to slidingly engage, in coaxial relationship, the second end 104 of the base member 80. Radially inwardly extending protrusions 106 which project towards the longitudinal axis 5 of the pump shaft 18 engage openings 108 in the cylindrical body 82 of the base member 80 allowing the base member and the sliding carrier 98 to be rotationally fixed relative to one another. The openings 108 extend longitudinally to allow the protrusions 106 of the sliding carrier 98 to move axially thereby allowing the sliding carrier limited longitudinal movement with respect to the base carrier 80, FIGS. 2 and 3. A radially outwardly flanged portion 110 extends from a second end 112 of the sliding carrier 98 to define a seat for the second end 114 of the compression spring 76. As defined thus far, the first, base member 80 and second, sliding member 98 form a longitudinally expandable, spool-like spring retainer operable to allow relative expansion of the assembly in the longitudinal direction under the urging of the compression spring 76. The inwardly extending protrusions 106 of the sliding carrier 98 engage the openings 108 of the base member 80 to rotationally lock the members together and to allow limited, relative axial movement between the members while preventing the members from becoming separated under the urging of the spring member 76. In addition, the openings 108 provide a path for the circulation of coolant through the pump seal cavity 56 to reduce temperatures during operation.

Radially directed flange 110 of the sliding member 98 includes a lip 116 which extends longitudinally towards the carbon wear disc 72 and includes an interlocking tab member 118 which engages a corresponding opening 120 in the wear disc to rotationally lock the wear disc 72 with the expanding carrier assembly 78. As a result of the rotational locking of the sliding carrier 98 with the carbon wear disc 72, the base member 80 with the sliding carrier 98, and the impeller 44 with the base member 80, the carbon wear disc is rotationally driven relative to the stationary bushing 58 in a manner required to establish the requisite hydrodynamic seal therebetween. As the wear disc 72 is reduced in thickness over time, the compression spring 76 operates to longitudinally expand the length of the seal assembly 54 by moving the sliding member 98 relative to the base member 80 thereby maintaining a desired longitudinal loading of the wear disc 72 against the closed end 66 of the stationary bushing 58.

Disposed between the second end 104 of the cylindrical body 82 of the base member 80 and the pump shaft 18 is an annular seal member 122. The seal member 122 is constructed of an elastomer that is suitable for disposition with the pump seal cavity mechanical, chemical and thermal environments. The internal diameter surface 124 of the annular seal member 122 may include serrations or ridges to optimize the available sealing forces exerted thereon such that sealing at the interface with the pump shaft 18 is maximized. Since the base member 80 of the expanding carrier assembly 78 does not move axially, relative to the pump shaft 18, the annular seal member 122 similarly establishes a fixed seal at its interface with the pump shaft under the radial urging of the second end 104 of the base member 80.

Similarly, a second, annular seal member 126 is disposed between the non-wearing surface 128 of the carbon wear disc 72 and the outwardly flanged portion 110 of the sliding carrier 98. The seal member 126 is axially compressed, against surface 128 of the wear disc 72 by the flanged portion 110 of the sliding carrier 98 under the longitudinal force exerted by the compression spring 76 in the direction of the wear disc. Under axial compression, a seal is established between the seal member 126 and the wear disc surface 128 with serrations formed in the surfaces of the seal member operable to maximize sealing stress for optimal sealing against leakage. As with the shaft seal member 122, the second seal member 126 is immovably compressed against the back of the wear disc and rotates with the pump shaft 18 and seal assembly 54 thereby establishing a fixed seal at the interface of the seal 126 and the wear disc surface 128.

Disposed between the first and second annular seal members 122,126, is an expanding wall or bellows portion 130 which operates to define a complete seal between the two annular seal members. The expanding wall 13 is designed to unfurl, FIGS. 2 and 3, as the aforementioned compensating axial travel of the carbon wear disc 72 and sliding carrier 98 takes place relative to the fixed base member 80. The primary function of the expanding wall portion 130 is to maintain a sealed and "dry" interface between the back, nonwearing surface 128 of the carbon wear disc 72 and the pump shaft 18 as the aforementioned dimensional changes to the carbon wear disc 72 takes place with service time. The expanding wall feature circumvents sealing problems created by rust and contamination that interferes with the proper operation of conventional wiping-type shaft seals since the actual sealing members 122 and 126 are not required to move during the service life of the pump. When the fluid in the pump 10 is pressurized, the expanding wall portion 130 is designed to press against the outer diameter of the pump shaft 18 thereby preventing bursting of the expanding wall portion 130 when subjected to elevated fluid pressure by providing a solid smooth reaction surface (the surface of the pump shaft 18) that limits the tensile stresses imparted on the elastomer.

The present invention discloses an improved water pump which provides discrete driving elements for the transmission of drive torque to the carbon wear disc independent of compression spring force allowing a lighter load spring to be employed to hold the wear disc in contact with the stationary bushing. The driving elements are also designed to compensate for the additional clearance created by the gradual wear of the carbon disc.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described were chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary rather than limiting, and the true scope of the invention is that described in the following claims.

I claim:

1. A water pump seal assembly for use between a rotatable pump shaft and a fixed housing comprising a base carrier member having a cylindrical body extending coaxially with said pump shaft and fixed longitudinally and rotationally with respect to said shaft to thereby rotate with said shaft, said base carrier member including a compression spring member disposed coaxially about said cylindrical body, said seal assembly further comprising a sliding carrier member having a cylindrical body extending coaxially with said pump shaft and having a first end in longitudinally slidable, rotationally fixed, coaxial disposition with an end of said cylindrical body of said base carrier member, said compression spring member operable to move said sliding carrier member longitudinally along said water pump shaft relative to said fixed base carrier, and a hydrodynamic sealing disc disposed between a second end of said sliding carrier member and said fixed housing said sealing disc rotationally fixed relative to said sliding carrier member, said base carrier member and said pump shaft to thereby rotate against said fixed housing and define a seal therebetween, and an elastomeric sealing member disposed between said sealing disc and said pump shaft to define a seal therebetween wherein said sliding carrier is operable to locate said hydrodynamic sealing disc longitudinally against said fixed housing under the bias of said compression spring.

2. A water pump seal assembly for use between a rotatable pump shaft and a fixed housing comprising a base carrier member having a cylindrical body extending coaxially with said pump shaft and fixed longitudinally and rotationally with respect to said shaft to thereby rotate with said shaft, said base carrier member including a flanged portion at a first end defining a seat for a first end of a compression spring member disposed coaxially about said cylindrical body, said seal assembly further comprising a sliding carrier member having a cylindrical body extending coaxially with said pump shaft and having a first end in longitudinally slidable, rotationally fixed, coaxial disposition with a second end of said cylindrical body of said base carrier member, said sliding carrier member including a flanged portion at a second end defining a seat for a second end of said compression spring member, said spring member operable to move said sliding carrier member longitudinally along said water pump shaft relative to said fixed base carrier, and a hydrodynamic sealing disc disposed between said second end of said sliding carrier member and said fixed housing said sealing disc rotationally fixed relative to said sliding carrier member, said base carrier member and said pump shaft to thereby rotate against said fixed housing and define a seal therebetween, and an elastomeric sealing member disposed between said sealing disc and said pump shaft to define a seal therebetween wherein said sliding carrier is operable to locate said hydrodynamic sealing disc longitudinally against said fixed housing under the bias of said compression spring.

3. A water pump seal assembly for use between a rotatable pump shaft and a fixed housing comprising a base carrier member having a cylindrical body extending coaxially with said pump shaft and fixed longitudinally and rotationally with respect to said shaft to thereby rotate with said shaft, said base carrier member including a flanged portion at a first end defining a seat for a first end of a compression Spring member disposed coaxially about said cylindrical body, said seal assembly further comprising a sliding carrier member having a cylindrical body extending coaxially with said pump shaft and having a first end in longitudinally slidable, rotationally fixed, coaxial disposition with a second end of said cylindrical body of said base carrier member to thereby rotate with said base carrier member and said pump shaft and move longitudinally relative to said base carrier member, said sliding carrier member including a flanged portion at a second end defining a seat for a second end of said compression spring member, said spring member operable to move said sliding carrier member longitudinally along said water pump shaft relative to said fixed base carrier, a hydrodynamic sealing disc disposed between said second end of said sliding carrier member and said fixed housing, said sealing disc rotationally fixed relative to said sliding carrier member, said base carrier member and said pump shaft to thereby rotate against said fixed housing and define a seal therebetween, wherein said sliding carrier is operable to locate said sealing disc longitudinally against said fixed housing under the bias of said compression spring, and an elastomeric sealing member disposed between said sealing disc and said pump shaft to define a seal therebetween said seal member comprising a first annular seal member extending about said shaft and defining a fixed seal therebetween, a second annular seal member extending about said shaft and defining a fixed seal against said sealing disc and an expandable bellows portion extending between said first and said second annular seal members, said bellows portion operable to sealingly interconnect said first annular seal member and said second annular seal member to thereby establish a seal between said water pump shaft and said sealing disc, said expandable bellows portion operable to unfurl as said sealing disc and associated second annular seal member moves longitudinally relative to said water pump shaft and associated first annular seal member as said sealing disc is subject to wear in the longitudinal direction.

* * * * *